US012769561B2

(12) United States Patent
D'Souza et al.

(10) Patent No.: US 12,769,561 B2
(45) Date of Patent: Oct. 20, 2026

(54) COHESIVE FRAMEWORK OF RUNTIME CHARACTERIZATION OF DYNAMIC SERVICES IN SOFTWARE-DEFINED VEHICLE ARCHITECTURES

(71) Applicant: Google LLC, Mountain View, CA (US)

(72) Inventors: Julius D'Souza, Palo Alto, CA (US); Ashutosh Agarwal, Bellevue, WA (US)

(73) Assignee: Google LLC, Mountain View, CA (US)

( * ) Notice: Subject to any disclaimer, the term of this patent is extended or adjusted under 35 U.S.C. 154(b) by 184 days.

(21) Appl. No.: 18/674,149

(22) Filed: May 24, 2024

(65) Prior Publication Data

US 2025/0362930 A1 Nov. 27, 2025

(51) Int. Cl.
*G06F 9/445* (2018.01)
*G06F 8/65* (2018.01)

(52) U.S. Cl.
CPC ................ *G06F 9/445* (2013.01); *G06F 8/65* (2013.01)

(58) Field of Classification Search
CPC .................................. G06F 9/445; G06F 8/65
USPC ............................................................. 713/1
See application file for complete search history.

(56) References Cited

U.S. PATENT DOCUMENTS 8,271,995 B1 9/2012 Papakipos et al.
11,405,234 B2 * 8/2022 Wasilczyk ................ G06F 8/76
11,843,685 B1 * 12/2023 Hartley ................... H04L 69/18
11,934,865 B2 * 3/2024 Ishigooka ............. G06F 9/3877
11,943,328 B1 * 3/2024 Hartley ................... H04L 67/55
11,985,238 B2 * 5/2024 Yang ....................... G06F 21/57
12,238,097 B2 * 2/2025 Farrell ................ H04L 63/0876
12,399,701 B2 * 8/2025 Lee .......................... G06F 8/65
2005/0154785 A1 7/2005 Reed et al.
2011/0055239 A1 * 3/2011 Wolf ................ G06F 16/24568 707/759
2012/0210335 A1 8/2012 Salt et al.
2012/0246316 A1 9/2012 Ramu et al.
2023/0289174 A1 * 9/2023 Wang ....................... G06F 8/65
(Continued)

OTHER PUBLICATIONS

"Android Automotive for Software-Defined Vehicles: An Assessment of Capabilities, Limitations, and Future Directions"—by Johannes Stumpfle, Akshay Kumar Venkatesha Narla, Nasser Jazdi, and Michael Weyrich; published Sep. 30, 2025; 6 pages (Year: 2025).*
(Continued)

*Primary Examiner* — Brian T Misiura
(74) *Attorney, Agent, or Firm* — Shumaker & Sieffert, P.A.

(57) ABSTRACT

A software defined vehicle (SDV) operating system may include components for executing software packages that declare unit types (e.g., interfaces) and define service units that each implement a unit type. For each unit type, there may be several service units that each provide a different implementation of that unit type. The SDV operating system may manage a service discovery module that registers service units for each unit type in a centralized registry. While executing a software package that declares a unit type, the service discovery module may fetch, from the centralized registry, an implementation of the unit type by a service unit defined by a different software package. While still executing the software package (i.e., at runtime), the SDV operating system may load a service unit defined by the software package with the fetched implementation. The SDV operating system may then execute the service unit based on the fetched implementation.

20 Claims, 5 Drawing Sheets

(56) References Cited

U.S. PATENT DOCUMENTS

| | | | | |
|---|---|---|---|---|
| 2025/0190209 | A1* | 6/2025 | Suchy | G06F 8/61 |
| 2025/0348305 | A1* | 11/2025 | Berg | G06F 8/65 |

OTHER PUBLICATIONS

"Bound services overview", Developers, Retrieved from: https://developer.android.com/develop/background-work/services/bound-services, Accessed on: Mar. 18, 2024, 18 pp.

"PackageManager", Developers, Retrieved from: https://developer.android.com/reference/android/content/pm/PackageManager, Accessed on: Mar. 18, 2024, 310 pp.

Hartley, "uProtocol: Connecting Automotive Apps and Services Everywhere!", SDV Eclipse Software Defined Vehicle, Retrieved from: https://docs.google.com/presentation/d/1yfJ_ynBGHQTcnG1GhyMQyhmO66KUdVEQN7UE24iNoeU/edit#slide=id.p, Accessed on: Mar. 18, 2024, 20 pp.

Extended Search Report from counterpart European Application No. 25178562.2 dated Oct. 16, 2025, 10 pp.

Yu et al., "The Digital Foundation Platform—A Multi-layered SOA Architecture for Intelligent Connected Vehicle Operating System", Cornell University Library, Oct. 17, 2022, 10 pp.

Response to Extended Search Report dated Oct. 16, 2025, from counterpart European Application No. 25178562.2 filed May 21, 2026, 30 pp.

* cited by examiner

COHESIVE FRAMEWORK OF RUNTIME CHARACTERIZATION OF DYNAMIC SERVICES IN SOFTWARE-DEFINED VEHICLE ARCHITECTURES

BACKGROUND

Software-defined vehicle (SDV) is an upcoming secular change in the automotive industry in which business logic encapsulated in Electronic Control Units (ECUs) may be migrated into a more central system running with an operating system. However, many design and updatability challenges have arisen in SDV architectures with respect to service communication across different hardware components that together comprise the programmable structure of the vehicle. Specifically, many challenges have arisen due to component logic and existing technology stacks that only employ static interface management.

SUMMARY

In general, techniques of this disclosure are directed to the management of interface implementations across a software-defined vehicle (SDV). An SDV operating system may include components for executing multiple software packages that declare unit types (e.g., interfaces) and define service units (e.g., units of execution, such as servers, clients, etc.) that each implement a unit type. Different service units defined by different software packages may simultaneously implement a unit type declared by a particular software package. That is, for each unit type, there may be several service units that each provide a different implementation of that unit type. The SDV operating system may manage a service discovery module that registers service units for each unit type in a centralized registry. While executing a particular software package that declares a specific unit type, the service discovery module may fetch, from the centralized registry, an implementation of the specific unit type by a service unit defined by a different software package. While still executing the particular software package (i.e., at runtime), the SDV OS may load the fetched implementation to provide the functionality described by the service unit. The SDV operating system may then execute the service unit based on the fetched implementation.

In one example, this disclosure describes a method including executing, at a first time, and by an operating system, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetching, by the operating system and from a centralized registry, a first set of implementations of the one or more unit types by the one or more service units; and while executing the first software package: loading, by the operating system, one or more service units defined by the first software package with the first set of implementations; and executing, by the operating system, the one or more service units based on the first set of implementations.

In yet another example, this disclosure describes a computing system including one or more processors; and one or more storage devices that store instructions, wherein the instructions, when executed by the one or more processors, cause the one or more processors to: execute, at a first time, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetch, from a centralized registry, a first set of implementations of the one or more unit types by the one or more service units; and while executing the first software package: load one or more service units defined by the first software package with the first set of implementations; and execute the one or more service units based on the first set of implementations.

In yet another example, this disclosure describes a computer-readable storage medium storing instructions that, when executed, cause one or more processors of a computing system to execute, at a first time, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetch, from a centralized registry, a first set of implementations of the one or more unit types by the one or more service units; and while executing the first software package: load one or more service units defined by the first software package with the first set of implementations; and execute the one or more service units based on the first set of implementations.

The details of one or more examples of the disclosure are set forth in the accompanying drawings and the description below. Other features, objects, and advantages will be apparent from the description and drawings, and from the claims.

DETAILED DESCRIPTION

Figure 1:
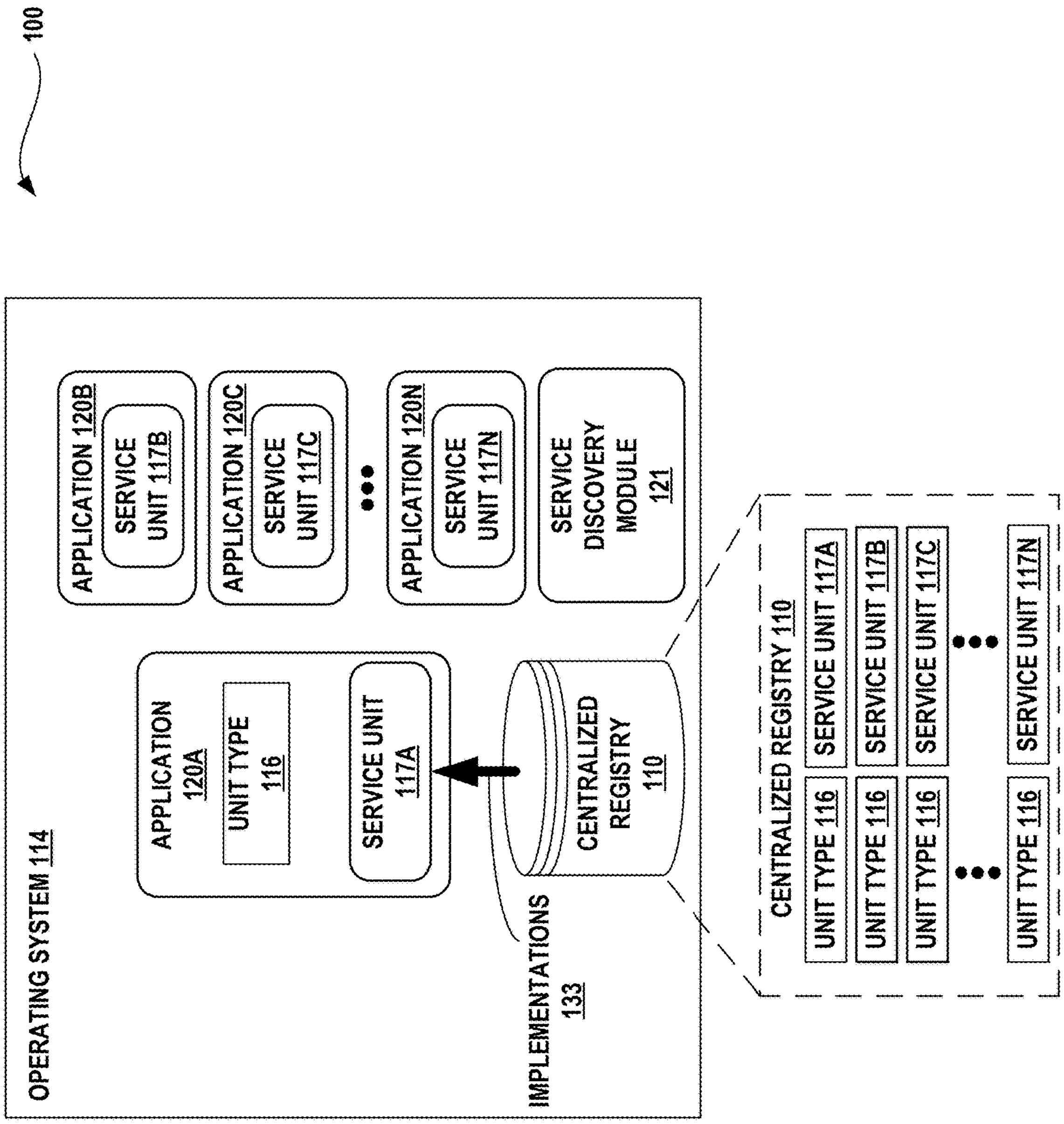
FIG. 1 illustrates an example operating system that manages a service discovery module for implementing interfaces declared by different software packages across a software defined vehicle, in accordance with one or more techniques of this disclosure.

FIG. 1 illustrates an example operating system that manages a service discovery module for implementing interfaces declared by different software packages across a software defined vehicle, in accordance with one or more techniques of this disclosure. In the example of FIG. 1, vehicle operating system (OS) 114 manages service discovery module 121, in which service discovery module 121 may be configured to identify and store information pertaining to different services provided across vehicle computing system 100.

Vehicle computing system 100 may be a computing system for a software defined vehicle. Vehicle computing system 100 may generally refer to a computing system included in automobiles such as cars, trucks, and vans, for the sake of simplicity and clarity within this disclosure. However, the techniques described herein may be applied to a wide variety of vehicle types, including motorcycles, recreational vehicles, farm vehicles and farm implements, aircraft, watercraft, and the like.

Vehicle computing system 100 may include one or more components such as automotive head units, engine control units (ECUs), engine control modules (ECM), control systems, servers, computing devices, full authority digital engine controls (FADECs), automotive computing modules, and the like. The components of vehicle computing system 100 may be interconnected to form a computing network of a vehicle.

In the example of FIG. 1, vehicle computing system 100 includes OS 114. OS 114 may utilize processing circuitry including logic circuitry that responds to and processes basic instructions that, when executed, cause a computing system to perform operations. For example, OS 114 may be executed on a centralized computing system module such as a System On a Chip or "SOC" type processing circuitry type device or a collection of interconnected components, such as a central processing unit (CPU) for executing operations and computer instructions, memory for storing computer instructions, Input/Output (I/O) components, communication busses, signal processing components, etc. In some examples, OS 114 may be an example software-defined vehicle (SDV) operating system that may include multiple software bundles or packages such as applications 120A-120N for multiple services that implement multiple interfaces across vehicle computing system 100.

Vehicle computing system 100 may execute one or more virtual machines, pods, or containerized workloads, among other types of virtualized computing environments. In traditional vehicles, distinct ECUs may be dedicated to specific functions like engine control, braking, infotainment, etc., in which each ECU may operate independently, and thus may cause redundancy in hardware, increased complexity, and updateability and security challenges. In SDVs, however, the integration of virtual machines may help to consolidate ECUs, as an SDV may use more powerful computing platforms that can host multiple virtual machines. Each virtual machine may function as a virtual ECU, which may help to reduce physical hardware needed, provide isolation of systems, and allow for greater flexibility in deploying and updating software. Furthermore, the use of virtual machines in SDVs may improve resource allocation, provide easier software development and testing environments, and result in safer, more efficient, and more adaptable vehicles.

Vehicle computing system 100 may execute a virtual machine to provide an execution environment for services and applications of vehicle computing system 100. The virtual machine may provide an execution environment for one or more processes such as an OS kernel of OS 114 and applications 120A-120N (collectively referred to herein as "applications 120"). Each application from applications 120 may uniquely map to a single OS process on a given SDV virtual machine. Applications 120 may represent software bundles, packages, or the like, may define multiple service units that implement interfaces.

As an example, vehicle computing system 100 may execute a virtual machine that provides an execution environment for a vehicle infotainment system and/or a virtual machine for safety functions of an SVD (e.g., door locks, airbag system, collision avoidance system, self-driving capabilities, etc.). In some examples, one or more of applications 120 may include one or more services that provide functionality of an application. For example, application 120A may be a distributed application composed of services that call other services and provide the functionality of application 120A. In some examples, application 120A may execute services that call other services executing in a different application and/or a different application executing within a different virtual machine.

In some examples, vehicle computing system 100 may include Electronic Control Unit (ECU) applications for managing engine timing, transmission shifting, engine fuel mixture, automatic braking systems, collision avoidance systems, etc. Vehicle computing system 100 may include various Software Defined Vehicle (SDV) modules that may control applications 120 for vehicle services such as radio and other multi-media operations, user configurable preferences such as interior LED colors and brightness, radar adaptive cruise control, and HVAC and/or climate control settings, such as interior cabin temperature, humidity, fresh-air intake, etc. Furthermore, applications 120 may not be limited to electric Original Equipment Manufacturer (eOEM) installed and/or Original Equipment Manufacturer (OEM) provided software applications. For instance, a compatible vehicle integrated infotainment system may be configured to download and install software applications at the request and direction of a user or vehicle owner from an application marketplace.

As described herein, OS 114 may include applications 120 that declare unit types (e.g., interfaces) and define service units (e.g., units of execution, such as servers, clients, etc.) that each implement a unit type. For example, as shown in the example of FIG. 1, OS 114 includes application 120A that declares unit type 116 and defines service unit 117A. A "unit type," as used throughout this disclosure, may be considered an identifier or type declaration associated with a service unit when the service unit is registered by service discovery module 121 in centralized registry 110. A "service unit," as used throughout this disclosure, may be considered a unit of execution, such as servers, clients, etc. For example, a unit type may be an interface type, and a service unit may be a Remote Procedure Call server or a Remote Procedure Call client. In another example, a unit type may be a message type, and a service unit may be a publisher unit or a subscriber unit. As such, a service unit may "implement" a unit type. However, unit types may not represent or include any business logic or code, and may only include semantic information. A service unit, or implementation of a unit type, may include business logic or code that implements the semantic information expressed in the unit type. Furthermore, a unit type name may be used by service discovery module 121 to discover service units across vehicle computing system 100 that are implementing that specific unit type. Thus, in the example of FIG. 1, application 120A may declare one or more unit types, such as unit type 116 (which may be an interface type, a message type, etc.) and define one or more service units, such as service unit 117A, in which each service unit may implement one unit type. For example, service unit 117A may implement unit type 116.

Different service units defined by different software packages across vehicle computing system 100 may simultaneously implement unit type 116 declared by application 120A. That is, service unit 117B of application 120B and service unit 117C of application 120C may simultaneously implement unit type 116, in which service units 117B and 117C may provide different implementations of unit type 116.

OS 114 may manage a service discovery module 121 that registers service units for each unit type in a centralized registry or database (i.e., the centralized registry or database may include a list of registered service units indexed by their respective implemented unit type). For example, as further shown in the example of FIG. 1, service discovery module 121 may be configured to identify and register service units 117B and 117C for unit type 116 in centralized registry 110. Centralized registry 110, as shown, may include a list including service units 117B and 117C indexed by unit type 116. In some examples, a unit type name may not be a global identifier, and instead may be package scoped. In some examples, each service unit may have a unique name when registered in centralized registry 110. Additionally, in some examples, the unique service unit name may be unique within the software package or application that declares the service unit.

Centralized registry 110 may provide an organized collection of structured information, or data, stored electronically within memory and/or persisted within a datastore. Centralized registry 110 may implement a database management system (DBMS) that manages stored data, relationships, database queries, updates, conflicts, etc. Collectively, the data stored within a database system, the DBMS, along with associated applications may be referred to as a "database system," which is often shortened to simply a "database." Centralized registry 100 may be a structured query language (SQL) type database system implementation that arranges data using rows and columns in a series of tables having defined relationships between them. Data stored in centralized registry 110 may be accessed, managed, modified, updated, controlled, and/or organized using a structured query language (SQL) for writing and querying data. As an example, service discovery module 121 may query centralized registry 110 to receive a set of implementations 133 of one or more unit types by one or more service units.

For example, while OS 114 is executing application 120A (i.e., at runtime), service discovery module 121 may fetch, from centralized registry 110, a first set of implementations 133 of one or more unit types by one or more service units 117B-117N. As shown in the example of FIG. 1, service discovery module 121 may fetch first set of implementations 133 including an implementation of unit type 116 by service unit 116B and/or an implementation of unit type 116 by service unit 116C. While still executing application 120A, OS 114 may load first set of implementations 133 to provide the functionality described by one or more service units defined by application 120A. As shown in the example of FIG. 1, OS 114 may load service unit 117A with either the implementation of unit type 116 by service unit 116B or the implementation of unit type 116 by service unit 116C. OS 114 may then execute the one or more service units defined by application 120A based on first set of implementations 133, e.g., OS 114 may execute service unit 117A based on the implementation of unit type 116 by service unit 117B.

In another example, while OS 114 is executing application 120N, service discovery module 121 may fetch, from centralized registry 110, an implementation of unit type 116 by service unit 117A. While still executing application 120N, OS 114 may load service unit 117N with the implementation of unit type 116 by service unit 117A. OS 114 may then execute service unit 117N based on the implementation of unit type 116 by service unit 117A.

Vehicle computing system 100 may include one or more in-vehicle networks or vehicular communication systems that provide communication paths between various vehicle service units, nodes, modules, etc. In some examples, an in-vehicle network may be exclusive to one specific vehicle service. In some examples, an in-vehicle network may be shared amongst multiple vehicle services. In some examples, vehicle computing system 100 may include a vehicle hardware abstraction layer proxy (VHAL proxy) that may be configured as a collection of executable instructions stored within memory or other persistent storage, that, when executed, interfaces with various components of vehicle computing system 100. The VHAL proxy may communicate with various components of vehicle computing system 100 via one or more in-vehicle networks (e.g., through a specific network address or bus system within vehicle computing system 100). The VHAL proxy may abstract hardware specifics and provide a consistent interface to OS 114 and application software, such that OS 114 and applications 120 may interact with various hardware components without needing to manage hardware-specific details. The VHAL proxy may further retrieve and manage data from hardware components across the vehicle and perform data abstraction.

In some examples, OS 114 may implement access control or perform "runtime checks" across services in vehicle computing system 100. That is, in some examples, the one or more unit types may include one or more of a public type, a protected type, and a local type, in which the one or more unit types are declared in accordance with an inter-process communication policy including information indicative of one or more software packages authorized to implement the one or more unit types. For example, if unit type 116 were a protected type, OS 114 may determine whether each of applications 120 is authorized to implement the protected type. Furthermore, during execution of an application, OS 114 may check to ensure that any component interacting with any other component within vehicle computing system 100 meets unit type requirements (e.g., interface requirements). In this way, security may be maintained across the operating system, and a particular service unit may not implement a unit type not suited for that particular service unit.

Furthermore, the techniques described herein may facilitate continuous runtime updates of interface implementations across OS 114, and may improve the framework for dynamic services particularly in SDV architectures. The use of runtime interface enforcement may provide a solution to the current challenges in SDV architectures relating to updatability and service communication across different hardware components, as new components may be dynamically integrated into vehicle computing system 100 system without requiring a full recompilation or restart. This may provide an advantage over vehicles lacking OS 114, as although these vehicles may have an infotainment system that communicates with various vehicle services, the systems of these vehicles may be highly fragmented due to the use of different and sometimes incompatible communication modes between vehicle services. Furthermore, vehicles lacking OS 114 are typically pre-configured at the time of manufacture to link interfaces to a corresponding vehicle service. Such a configuration essentially results in a "hard coding" of vehicle services to vehicle interfaces. As an example, if a user presses a button for "next radio station" in their vehicle, the module responsible for controlling the changing of radio stations may be already hard-coded by the automobile manufacturer. This hard coding may limit flexibility; for example, any other applications designed to alter the radio station (e.g., radio controls on a steering wheel, radio controls within an infotainment system, radio controls via dedicated buttons on a center console, etc.) must also adhere rigidly to the predefined communication paths and interfaces. Furthermore, the same manufacturer may utilize a different radio, different radio control module, and/or different radio user controls and interfaces for different trim levels of the same base vehicle, necessitating the manufacturer to separately pre-configure a hard-coded communications path between the different components. The problem of fragmentation may be even more complex and difficult to manage when considering different vehicle models, different model years, different suppliers that may have inconsistent communication settings, different OEM manufacturers, etc.

As such, OS 114 may provide a solution to the limitations of static interface management, as service discovery module 121 may facilitate dynamic interface discovery and utilization, in which implementations defined by one developer can be dynamically discovered and integrated by other developers at runtime, e.g., service units 117B-117N may implement unit type 116 declared by application 120A at runtime, and/or service unit 117A may be loaded and/or updated with an implementation of unit type 116 by one of service units 117B-117N at runtime. In other words, service units defined by a particular software package may be dynamically updated with different implementations by other service units defined across an operating system, multiple implementations of the same unit type may exist across multiple different software packages, and the multiple different software packages may be dynamically updated independently of each other. In this way, flexibility in interface configurations may be improved, thus improving the adaptability and updatability of OS 114 and component logic across vehicle computing system 100.

Figure 2:
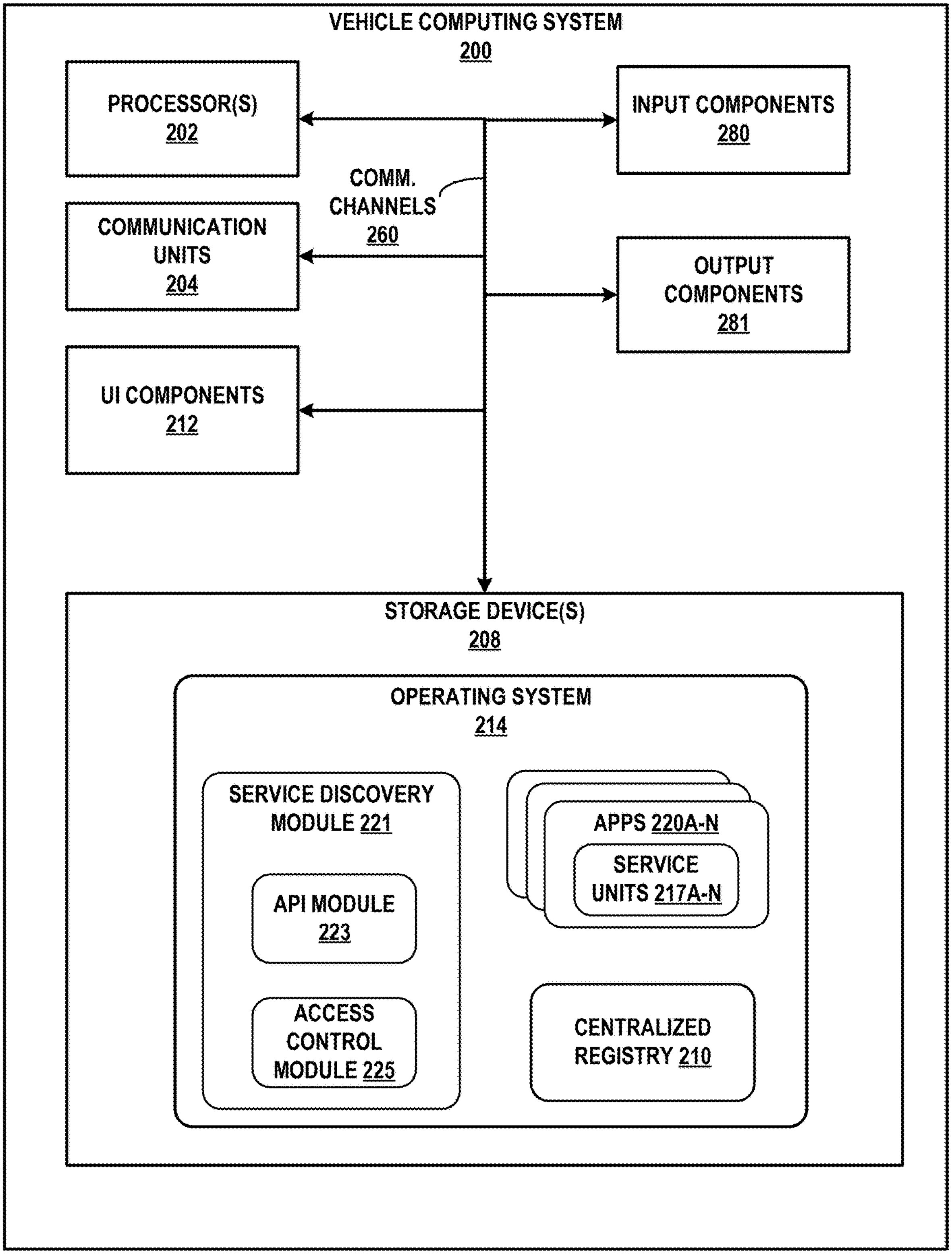
FIG. 2 illustrates an example vehicle computing device including an operating system that manages a service discovery module for implementing interfaces declared by different software packages across a software defined vehicle, in accordance with one or more techniques of this disclosure.

FIG. 2 illustrates an example vehicle computing system including an operating system that manages a service discovery module for implementing interfaces declared by different software packages across a software defined vehicle, in accordance with one or more techniques of this disclosure. For the purposes of clarity, one or more components of vehicle computing system 200 are described below as an example of vehicle computing system 100 as illustrated in FIG. 1. Vehicle computing system 200 may be included within an SDV and provide one or more types of functionalities for the SDV. FIG. 2 illustrates only one example of vehicle computing system 200, and many other examples of vehicle computing system 200 may be used in other instances and may include a subset of the components included in example vehicle computing system 200 or may include additional components not shown in FIG. 2.

Vehicle computing system 200 may include one or more computing devices, such as a mobile phone, a tablet computer, a laptop computer, a desktop computer, a server, a mainframe, a set-top box, a television, a wearable system, an automation system or system, a gaming system, a media player, an e-book reader, a mobile television platform, an automobile navigation or infotainment system, vehicle control system, or any other type of mobile, non-mobile, wearable, and non-wearable computing device.

As shown in the example of FIG. 2, vehicle computing system 200 includes one or more processors 202, one or more communication units 204, user interface component 212 (hereinafter "UIC 212"), one or more input components 280, one or more output components 281, and one or more storage devices 208. Storage device 208 may include OS 214, which may further include service discovery module 221, centralized registry 210, and applications ("apps") 220A-220N (referred to collectively herein as "applications 220") defining service units 217A-217N (referred to collectively herein as "service units 217").

Communication channels 260 (illustrated as "COMM. CHANNELS 260" in FIG. 2) may interconnect each of the components of FIG. 2 for inter-component communications (physically, communicatively, and/or operatively). In some examples, communication channels 260 may include a system bus, a network connection, an inter-process communication data structure, or any other method for communicating data. For example, communication channels 260 may interconnect storage devices 208 to other components for vehicle computing system 200. In another example, communication channels 260 may interconnect input components 280 to other components of vehicle computing system 200.

One or more input components 280 of vehicle computing system 200 may receive input. Input components 280 may receive input such as tactile, audio, and video input. Input components 280 of vehicle computing system 200, in one example, includes a presence-sensitive display, touch-sensitive screen, mouse, keyboard, voice responsive system, video camera, microphone or any other type of system for detecting input from a human or machine.

One or more output components 281 of vehicle computing system 200 may generate output. Output components 281 may generate output such as tactile, audio, and video output. Output components 281 of vehicle computing system 200, in one example, includes a presence-sensitive display, sound card, video graphics adapter card, speaker, liquid crystal display (LCD), organic light-emitting diode (OLED) display, a light field display, haptic motors, linear actuating systems, or any other type of system for generating output to a human or machine.

UIC 212 of vehicle computing system 200 may be hardware that functions as an input and/or output system for vehicle computing system 200. For example, UIC 212 may include a display component, which may be a screen at which information is displayed by UIC 212 and a presence-sensitive input component that may detect an object at and/or near the display component.

One or more communication units 204 of vehicle computing system 200 may communicate with external systems via one or more wired and/or wireless networks by transmitting and/or receiving network signals on the one or more networks. Communication units 204 may include a network interface card (e.g., an Ethernet card), an optical transceiver, a radio frequency transceiver, a GPS receiver, or any other type of system that can send and/or receive information. Communication units 204 may also include short wave radios, cellular data radios, wireless network radios, as well as universal serial bus (USB) controllers. In some examples, vehicle computing system 200 may communicate using only internal communications when communication units 204 lose connectivity to external networks. For example, due to the mobile nature of a vehicle in which vehicle computing system 200 is integrated, vehicle computing system 200 may enter areas with little to no cellular or wireless internet access. Communication units 204 may then be unable to provide external connectivity to one or more components of vehicle computing system 200 such as processors 202.

OS 214 may include an operating system kernel such as a Linux® kernel, Windows NT kernel, Unix-based kernel, hybrid kernel, or another proprietary operating system kernel. OS 214 may be executed by processors 202. Processors 202 may be one or more types of processors such as application-specific integrated circuit (ASIC), field-programmable gate array (FPGA), reduced instruction set computer (RISC) processor, general-purpose processor, or other type of processor. Processors 202 may include one or more cores and/chiplets configured to implement functionality and/or execute instructions within vehicle computing system 200. For example, one or more processors 202 on vehicle computing system 200 may receive and execute instructions stored by one or more storage devices 208 that execute the functionality of OS 214. The instructions executed by one or more processors 202 may cause vehicle computing system 200 to store information within one or more storage devices 208 during program execution. Examples of one or more processors 202 include application processors, display controllers, sensor hubs, and any other hardware configured to function as a processing unit. One or more processors 202 may execute instructions of OS 214 to perform actions or functions. OS 114 may be executed on a centralized computing system module such as a vehicle control unit (VCU), System On a Chip or "SOC" type processing circuitry type device or a collection of interconnected components, such as a central processing unit (CPU) for executing operations and computer instructions, memory for storing computer instructions, Input/Output (I/O) components, communication busses, signal processing components, etc.

Vehicle computing system 200 includes storage devices 208. Storage devices 208 may include one or more types of storage such as solid-state storage, random access memory (RAM), hard disk drives, eMMC memory, optical discs, floppy discs, flash memories, or forms of electrically programmable memories (EPROM) or electrically erasable and programmable (EEPROM) memories, and other types of storage. Storage devices 208 may store data for one or more programs and processes. Storage devices 208 of vehicle computing system 200 may also include OS 214, which may further include service discovery module 221, centralized registry 210, and applications 220 defining service units 217.

As described herein, OS 214 may include a plurality of applications (i.e., software packages) 220 for services provided across vehicle computing system 200. For example, OS 214 may execute application 220A from applications 220, which may be an infotainment system that provides functionality such as media playback, vehicle information, etc. In another example, application 220B from applications 220 may provide vehicle diagnostics functions and analyze data generated by components of an SDV in which vehicle computing system 200 is incorporated. In yet another example, application 220C from applications 220 may manage self-driving functionality of the SDV. As described above, each application from applications 220 may define one or more service units 217 that provide functionality of the application.

As shown in the example of FIG. 2, service discovery module 221 may further include application programming interface (API) module 223. API module 223 may provide a uniform API for registering and discovering unit types declared by applications 220 across vehicle computing system 200 (e.g., Publisher/Subscriber (Pub/Sub) message types, remote procedure call (RPC) interfaces, runtime interfaces or inter-process communication (IPC) interfaces, etc.). In some examples, API 223 may be provided in various forms or by various services to support RPC interactions and/or Pub/Sub systems, such as XML-RPC, JSON-RPC, cloud-based Pub/Sub services, Advanced Message Queuing Protocol (AMQP), Simple Notification Service (SNS), Simple Queue Service (SQS), and the like. Service discovery module 221 may further include access control module 225, which may provide access control lists that govern the permissions of applications 220 to implement certain unit types. As described herein, a unit type may also be declared as one or more of a public type, a protected type, and a local type, in which the unit type may be declared in accordance with an inter-process communication (IPC) policy including information indicative of one or more software packages authorized to implement the unit type.

In some examples, the IPC may include information pertaining to the operations present between a server and client and their signature as well as how access is granted for each operation. Specifically, in some examples, for an interface, the IPC policy (which may be written by a developer) may determine the methods a server needs to provide and the types it can take. The IPC policy may further determine the permissions needed for access to the methods. In some examples, the IPC policy may be compiled at build time but checked at runtime. As such, OS 214 may treat IPC interface specifications as extensible "first class citizens" in vehicle computing system 200, i.e., IPC interface specifications may be given a high level of importance and integration within vehicle computing system 200. Thus, the IPC interfaces described herein may be built into the core of OS 214 with robust support and accessibility.

For example, with a runtime interface mechanism, an interface is its own entity may be tracked by OS 214 along with associated permissions and compatibility. As such, a loose coupling may be provided between servers and clients. For example, when a server declares an implementation of an interface, the server's implementation may be checked at runtime for compatibility with the interface definition and relevant permission privileges. OS 214 may manage the means of transport and discovery between servers and clients via service discovery module 221. Interested clients may query service discovery module 221 using IPC interfaces to discover and connect with servers that implement the provided interface. Then, permissions enforcement may be performed at runtime as part of an enforcing policy.

Regarding permissions, a public type may be a unit type that can be implemented by any of service units 217 regardless of the application associated with a particular service unit. A protected type may be a unit type that can only be implemented by an authorized service unit. A service unit may be considered an authorized service unit if the unit type is declared within the same application as the service unit or if the unit type provides an access control list (ACL) that allows the service unit's application to implement the unit type. For example, a particular Pub/Sub message type may be a protected type, in which access control module 225 may determine, based on an ACL provided by the protected Pub/Sub message type, whether an application 220 is authorized to implement the protected Pub/Sub message type. As such, access control module 225 may restrict the number of applications that can implement a particular unit type, define which software packages can access a service, define the conditions in which a software package can access a service, define which operations a software package can perform. As such, a set of implementations of a particular unit type may not include all implementations of the unit type across vehicle computing system 200. In this way, the security of service discovery module 221 and vehicle computing system 200 may be enhanced.

As described above, service units 217 may each implement a unit type declared by an application from applications 220. As an example, application 220A may declare an RPC interface type and define service unit 217A, which may be an RPC server that implements the RPC interface type. An RPC interface may allow a software package to cause a procedure, subroutine, or method to execute in another address space. As an example, service unit 217A may define a procedure that can be called by other software packages. For example, service unit 217B, which may be authorized to implement the RPC interface type declared by service unit 217A, may act as an RPC client that makes requests to service unit 217A, such that service unit 217B can perform the procedure defined by service unit 217A. However, as described herein, the specific communication process and interaction between service unit 217A and service unit 217B may be abstracted by service discovery module 221. Specifically, application 220B may provide a command to service discovery module 221 indicating a request for implementations of the specific RPC interface, in which service discovery module 221 may use API 223 to get the implementation by service unit 217A. Service unit 217B may be loaded and executed with the procedure defined by service unit 217A. Service unit 217B may further be registered by discovery module 221 in centralized registry 210 under the RPC interface type name.

In another example, service unit 217A may be a Pub/Sub Publisher, and service unit 217B may be a Pub/Sub Subscriber. Application 220A may declare a specific unit type such as a Pub/Sub message or topic type to which service unit 217A can publish. Service unit 217B may be subscribed to the Pub/Sub message or topic type declared by application 220A, in which service unit 217B may receive any messages (e.g., data or metadata specific to an application's needs) published to the message or topic type by service unit 217A. Similar to the RPC example above, the specific communication process and interaction between service unit 217A and service unit 217B in this Pub/Sub example may be abstracted by service discovery module 221. Specifically, application 220B may provide a command to service discovery module 221 indicating a request for implementations of the specific message or topic type, in which service discovery module 221 may use API 223 to get the implementation by service unit 217A. Service unit 217B may be loaded and executed with a subscription to service unit 217A. Service unit 217B may further be registered by discovery module 221 in centralized registry 210 under the Pub/Sub message or topic type name.

As described herein, centralized registry 210 may include a list of registered service units for each of the one or more unit types, in which each registered service unit implements one of the one or more unit types. Centralized registry 210 may be updated with new service unit registrations during vehicle computing system 200 operation. Any service unit 217 authorized to implement a specific unit type may discover other service units implementing the specific unit type via service discovery module 221. For instance, at runtime, application 220A may provide a string input to service discovery module 221 that specifies a request for one or more implementations of one or more unit types.

As an example, consider an example application in which application 220A declares a public interface "AudioControl," (which, for example, may have a unit type name of "AudioControl"). Application 220A may define a service unit 217A that implements "AudioControl" to control audio functions like starting, pausing, and stopping playback. Service unit 217A may be registered by service discovery module 221 in centralized registry 210 under the unit type name of "AudioControl." A different application 220B, which may be an infotainment system, may provide a command to service discovery module 221 indicating a request for implementations of the unit type "AudioControl." For example, to receive a list of all units registered by all bundles (i.e., applications or packages) across the entire vehicle with the "AudioControl" unit type name, the following command may be provided: "ServiceDiscovery.list (#AudioControl)." Provided that access control module 225 determines that application 220B is authorized to implement unit type "AudioControl," service discovery module 221 may query centralized registry 210 using the command input, and fetch the implementation of 'AudioControl' by service unit 217A. For example, service discovery 221 may return a list such as [(Identity(AudioControl), /audio-control-implementation)], in which "Identity(AudioControl)" indicates the unit type name used to discover the "/audio-control-implementation" by service unit 217A. As shown in this example, application 220B and application 220A may be "loosely coupled" or "decoupled." That is, the applications and components of vehicle computing system 200 may interact through an intermediary such as service discovery module 221, in which service discovery module 221 may abstract away any knowledge the applications and components have of each other. Vehicle computing system 200 may be considered to have a Service-Oriented Architecture (SOA), in which services or applications across vehicle computing system 200 may interact with each other through service discovery module 221, but do not need to be aware of the internal workings of the other services or applications they interact with. It should be noted that in some examples, however, the command input provided to service discovery module 221 may indicate a request for one or more implementations by a specific application or service unit.

Continuing the example above, while executing application 220B, OS 214 may load one or more service units defined by application 220B with the implementation of 'AudioControl' by service unit 217A. For example, application 220B may include service unit 217B that controls audio for the infotainment system, and service unit 217B may be loaded with the implementation of 'AudioControl' provided by service unit 217A. Service unit 217B may also be registered by service discovery module 221 in centralized registry 210 under the unit type name of 'AudioControl.'

Figure 3:
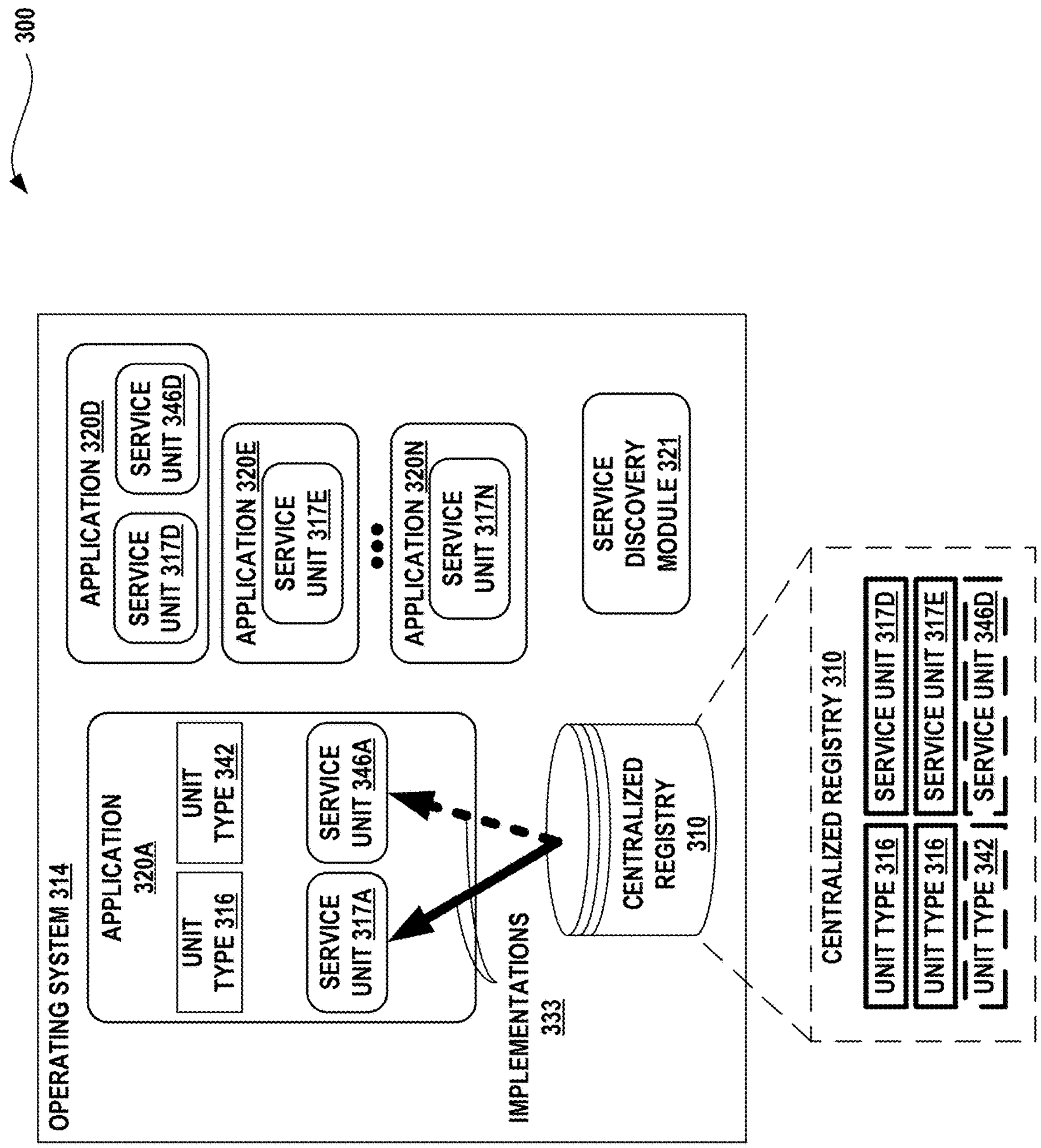
FIG. 3 illustrates an example operating system that manages a service discovery module for performing updates of interface implementations across a software defined vehicle, in accordance with one or more techniques of this disclosure.

FIG. 3 illustrates an example operating system that manages a service discovery module for performing updates of interface implementations across a software defined vehicle, in accordance with one or more techniques of this disclosure. For the purposes of clarity, one or more components of vehicle computing system 300 are described below as an example of vehicle computing system 100 as illustrated in FIG. 1 and/or vehicle computing system 200 as illustrated in FIG. 2. Vehicle computing system 300 may be included within an SDV and provide one or more types of functionalities for the SDV. FIG. 3 illustrates only one example of vehicle computing system 300, and many other examples of vehicle computing system 300 may be used in other instances and may include a subset of the components included in example vehicle computing system 300 or may include additional components not shown in FIG. 3.

In the example of FIG. 3, OS 314 may execute, at a second time, application 320A. As shown in the example of FIG. 3, applications 320A may declare unit type 316 and unit type 342. While executing application 320A, discovery service 321 may fetch, from centralized registry 310, a second set of implementations 333 including implementations of unit type 316 and unit type 342 by one or more service units 317A-317N defined by one or more applications 320B-320N. As shown in the example of FIG. 3, application 320D defines service unit 317D that implements unit type 316 and defines service unit 346D that implements unit type 342. Application 320E defines service unit 317E that implements unit type 316. As further shown in the example of FIG. 3, service units 317D, 346D, and 317D are all registered in centralized registry 310 under the respective unit type. While still executing application 320A, OS 314 may update one or more service units defined by 320A with the second set of implementations 333 including implementations of unit type 316 and unit type 342. That is, OS 314 may update service unit 317A with either the implementation of unit type 316 by service unit 317D or the implementation of unit type 316 by service unit 317E. OS 314 may update (or load) service unit 346A with the implementation of unit type 342 by service unit 346D. OS 314 may execute service unit 317A and service unit 346A based on the second set of implementations 333.

As such, OS 314 and service discovery module 221 may provide a solution to the updatability challenges often faced by SDV architectures with respect to service communication across different hardware components. Rather than employing static interface management, OS 314 and service discovery module 221 may employ runtime interface enforcement, which may provide greater flexibility in systems where components might be unknown at compile time or might be updated or changed frequently. Additionally, updates may be performed and integrated dynamically, such that a full recompilation or restart of the system is not required.

Figure 4:
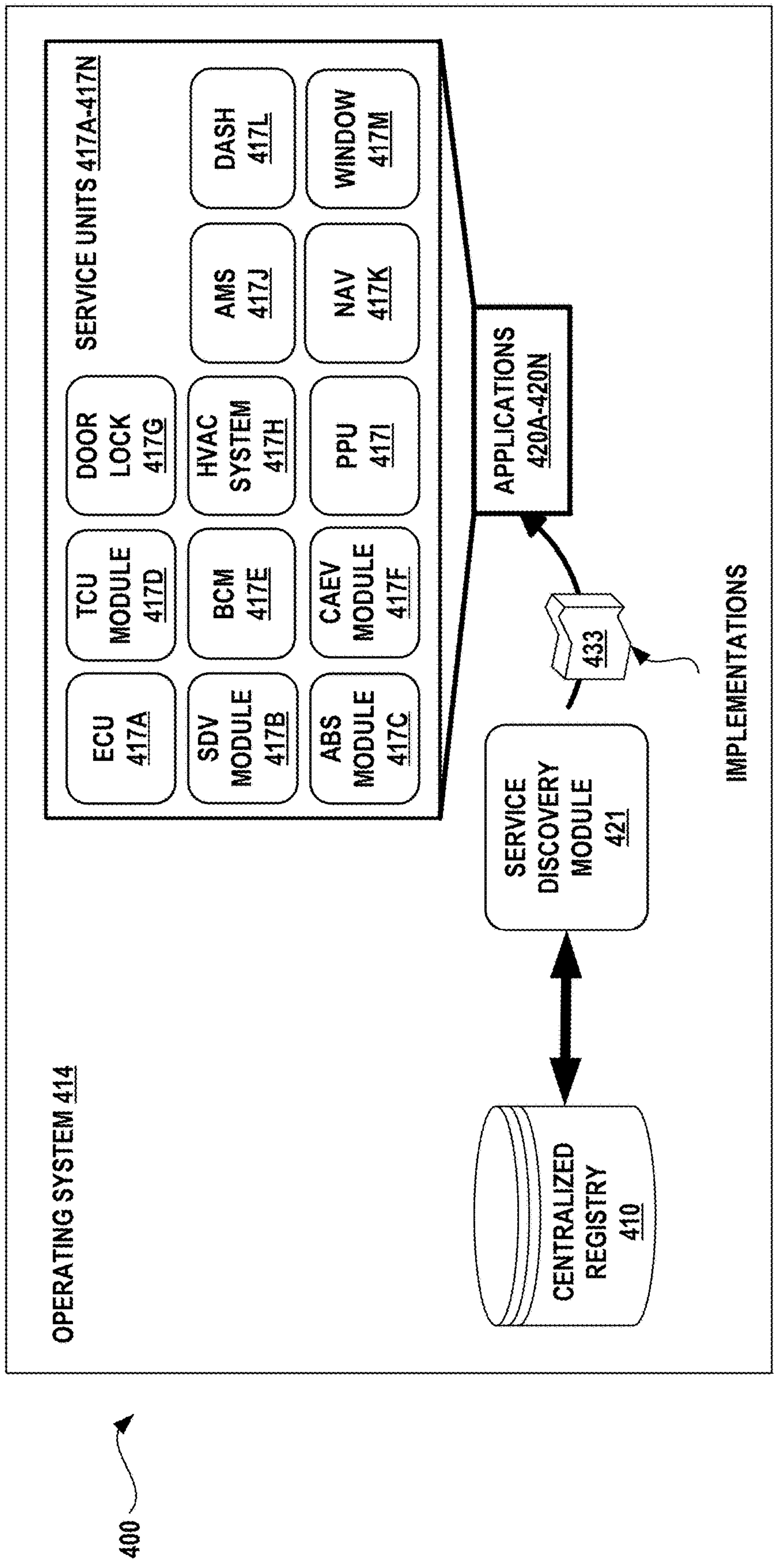
FIG. 4 illustrates an example vehicle having various types of service units discoverable by a service discovery module, in accordance with one or more techniques of this disclosure.

FIG. 4 illustrates an example vehicle having various types of service units discoverable by a service discovery module, in accordance with one or more techniques of this disclosure. For the purposes of clarity, one or more components of vehicle computing system 400 are described below as an example of vehicle computing system 100 as illustrated in FIG. 1, vehicle computing system 200 as illustrated in FIG. 2, and/or vehicle computing system 300 as illustrated in FIG. 3. Vehicle computing system 400 may be included within an SDV and provide one or more types of functionalities for the SDV. FIG. 4 illustrates only one example of vehicle computing system 400, and many other examples of vehicle computing system 400 may be used in other instances and may include a subset of the components included in example vehicle computing system 400 or may include additional components not shown in FIG. 4. As shown in the example of FIG. 4, vehicle computing system 400 may include one or more applications 420A-420N (collectively referred to herein as "applications 420") that further define one or more service units 417A-417N (collectively referred to herein as "service units 417"). In some examples, service units 417, applications 420, service discovery module 421, and centralized registry 410 may be interconnected through various types of in-vehicle networks used throughout the automotive industry, including but not limited to a Controller Area Network (CAN), Media Oriented Systems Transport (MOST), Local Interconnect Network (LIN), Flexray Automotive Communication Bus (FACB), Automotive Ethernet, Onboard Automotive LTE, vehicle based WI-FI, and vehicle based BLUETOOTH. In some examples, service units 417, applications 420, and service discovery module 421 may be configured to communicate outside of a vehicle to remote services, such as payment devices for toll roads, satellite-based radio services, and cloud services for vehicle computing system 400.

As described herein, service discovery module 421 may allow service units across vehicle computing system 400 to indirectly discover implementations of unit types by other service units, no matter the subsystems in which they may be includes (e.g., Electronic Control Unit (ECU) type automobile subsystems and Software Defined Vehicle (SDV) type automobile subsystems) through an integrated infotainment system of a vehicle. As shown in the example of FIG. 4, some of service units 417A-417N may include Engine Control Unit (ECU) 417A, Software Defined Vehicle (SDV) module 417B, Anti-lock Braking System (ABS) module 417C, Transmission Control Unit (TCU) module 417D, Body Control Module (BCM) 417E, Connected and Autonomous Electric Vehicle (CAEV) module 417F, Door Lock Controller (DOOR LOCK) 417G, Heating, Ventilation, and Air Conditioning (HVAC) system 417H, Pedestrian Protection Unit (PPU) 417I, Airbag Management System (AMS) 417J, navigation head unit (NAV) 417K, vehicle dashboard system 417L, and power window controller (WINDOW) 417M. Other service units included in vehicle computing system 400 may include, but are not limited to, an automatic engine start system, a radar system, a rain sensor, etc.

As described herein, service units 417 may be defined by applications 420 (in which one or more of service units 417 may be defined by a single application 420) and provide different services across a vehicle. Service units 417A-417N may be unaware of each other; that is, vehicle services provided by service units 417 may not be hard-coded to vehicle interfaces defined across vehicle computing system 400. As described herein, each service unit may be dynamically loaded or updated with interface implementations made by other service units through the discovery service provided by service discovery module 421. That is, when executing, for example, an application 420 that defines HVAC system 417H and WINDOW 417M, OS 414 may load or update HVAC system 417H and WINDOW 417M with a set of implementations 433 retrieved from centralized registry 410 by service discovery module 421. Implementations 433 may include an implementation of a unit type implemented by HVAC system 417H and an implementation of a unit type implemented by WINDOW 417M.

Figure 5:
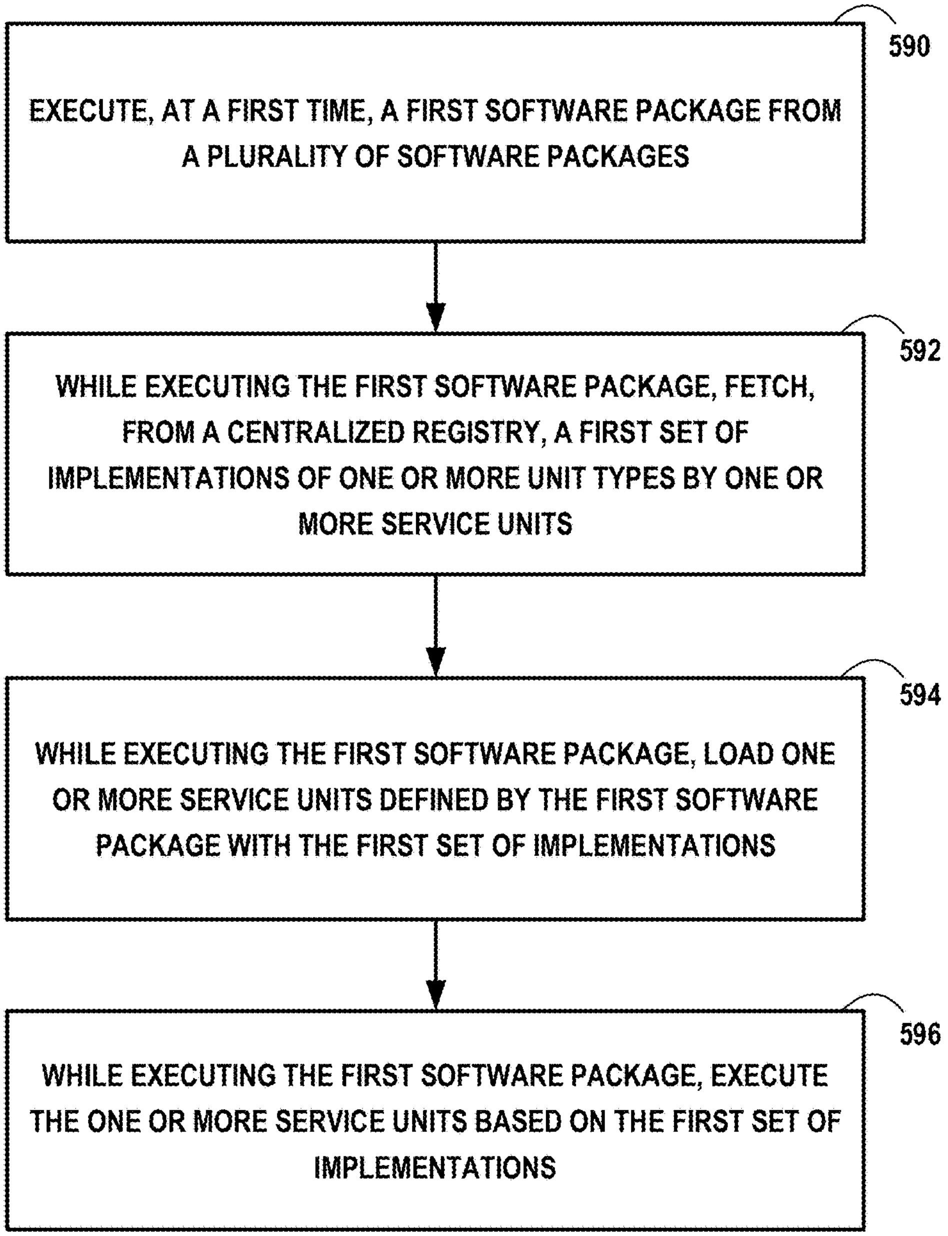
FIG. 5 is a flow chart illustrating an example mode of operation for an operating system that manages a service discovery module for implementing interfaces declared by different software packages across a software defined vehicle, in accordance with techniques of this disclosure.

FIG. 5 is a flow chart illustrating an example mode of operation for an operating system that manages a service discovery module for implementing interfaces declared by different software packages across a software defined vehicle, in accordance with techniques of this disclosure. For the purposes of clarity, FIG. 5 is discussed in reference to FIG. 3.

OS 314 executes, at a first time, a first software package from a plurality of software packages, such as application 320A from applications 320 (590). In some examples, application 320A includes declarations of one or more unit types, such as unit type 316 and unit type 342. In some examples, each application from the plurality of applications 320 defines one or more service units, such as application 320D that defines service unit 317D and service unit 346D. In some examples, one or more of the one or more service units implements one of the one or more unit types. For example, service unit 317D implements unit type 316 and service unit 346D implements unit type 342. In some examples, different service units defined by different software packages are configured to simultaneously implement one of the one or more unit types. For example, service unit 317D defined by application 320D and service unit 317E defined by application 320E are configured to simultaneously implement unit type 316.

While executing application 320A, OS 314 fetches, from centralized registry 310, a first set of implementations 333 including an implementation of unit type 316 by service unit 317E and an implementation of unit type 342 by service unit 346D (592). In some examples, centralized registry includes a list of registered service units for each of the one or more unit types, and wherein each registered service unit implements one of the one or more unit types.

While executing application 320A, OS 314 loads service units 317A and 346A defined by application 320A with the first set of implementations 433 (594). While executing application 320A, OS 314 executes service unit 317A based on the implementation of unit type 316 by service unit 317E and executes service unit 346A based on the implementation of unit type 342 by service unit 346D (596).

In some examples, the one or more unit types include one or more of a public type, a protected type, and a local type. In some examples, the one or more unit types are declared in accordance with an inter-process communication policy including information indicative of one or more software packages authorized to implement the one or more unit types. For example, unit type 316 may be declared as a protected type, in which OS 314 determines whether each of applications 320 is authorized to implement unit type 316.

In some examples, the one or more unit types may be one or more interface types, in which the one or more service units include one or more Remote Procedure Call servers and one or more Remote Procedure Call clients. For example, unit type 316 may be an interface type and service unit 317D may be a Remote Procedure Call server. In some examples, the one or more unit types may be one or more message types, in which the one or more service units include one or more publisher units and one or more subscriber units. For example, unit type 342 may be a message type and service unit 346A may be a subscriber unit.

In some examples, OS 314 executes, at a second time, application 320A. While executing application 320A, OS 314 fetches, from centralized registry 310, a second set of implementations 333 including an implementation of unit type 316 by service unit 317E. While executing application 320A, OS 315 updates service unit 317A defined by application 320A with the second set of implementations 33. While executing application 320A, OS 314 executes service unit 317A based on the implementation of unit type 316 by service unit 317E.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

This disclosure includes the following examples:

Example 1. A method comprising: executing, at a first time, and by an operating system, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetching, by the operating system and from a centralized registry, a first set of implementations of the one or more unit types by the one or more service units; and while executing the first software package: loading, by the operating system, one or more service units defined by the first software package with the first set of implementations; and executing, by the operating system, the one or more service units based on the first set of implementations.

Example 2. The method of example 1, further comprising: executing, at a second time, and by the operating system, the first software package; while executing the first software package, fetching, by the operating system and from the centralized registry, a second set of implementations of the one or more unit types by the one or more service units; while executing the first software package, updating, by the operating system, the one or more service units defined by the first software package with the second set of implementations; and executing, by the operating system, the one or more service units based on the second set of implementations.

Example 3. The method of any of examples 1 and 2, wherein different service units defined by different software packages are configured to simultaneously implement one of the one or more unit types.

Example 4. The method of any of examples 1-3, wherein the centralized registry includes a list of registered service units for each of the one or more unit types, and wherein each registered service unit implements one of the one or more unit types.

Example 5. The method of any of examples 1-4, wherein the one or more unit types include one or more of a public type, a protected type, and a local type, and wherein the one or more unit types are declared in accordance with an inter-process communication policy including information indicative of one or more software packages authorized to implement the one or more unit types.

Example 6. The method of example 5, wherein the one or more unit types include the protected type, the method further comprising: determining, by the operating system, whether each of the one or more software packages is authorized to implement the protected type.

Example 7. The method of any of examples 1-6, wherein the one or more unit types include one or more interface types, and wherein the one or more service units include one or more Remote Procedure Call servers and one or more Remote Procedure Call clients.

Example 8. The method of any of examples 1-7, wherein the one or more unit types include one or more message types, and wherein the one or more service units include one or more publisher units and one or more subscriber units.

Example 9. A computing system comprising: one or more processors; and one or more storage devices that store instructions, wherein the instructions, when executed by the one or more processors, cause the one or more processors to: execute, at a first time, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetch, from a centralized registry, a first set of implementations of the one or more unit types by the one or more service units; and while executing the first software package: load one or more service units defined by the first software package with the first set of implementations; and execute the one or more service units based on the first set of implementations.

Example 10. The computing system of example 9, wherein the one or more processors are further configured to: execute, at a second time, the first software package; while executing the first software package, fetch, from the centralized registry, a second set of implementations of the one or more unit types by the one or more service units; while executing the first software package, update the one or more service units defined by the first software package with the second set of implementations; and execute the one or more service units based on the second set of implementations.

Example 11. The computing system of any of examples 9 and 10, wherein different service units defined by different software packages are configured to simultaneously implement one of the one or more unit types.

Example 12. The computing system of any of examples 9-11, wherein the centralized registry includes a list of registered service units for each of the one or more unit types, and wherein each registered service unit implements one of the one or more unit types.

Example 13. The computing system of any of examples 9-12, wherein the one or more unit types include one or more of a public type, a protected type, and a local type, and wherein the one or more unit types are declared in accordance with an inter-process communication policy including information indicative of one or more software packages authorized to implement the one or more unit types.

Example 14. The computing system of example 13, wherein the one or more unit types include the protected type, wherein the one or more processors are further configured to: determine whether each of the one or more software packages is authorized to implement the protected type.

Example 15. The computing system of any of examples 9-14, wherein the one or more unit types include one or more interface types, and wherein the one or more service units include one or more Remote Procedure Call servers and one or more Remote Procedure Call clients.

Example 16. The computing system of any of examples 9-15, wherein the one or more unit types include one or more message types, and wherein the one or more service units include one or more publisher units and one or more subscriber units.

Example 17. A computer-readable storage medium storing instructions that, when executed, cause one or more processors of a computing system to: execute, at a first time, a first software package from a plurality of software packages, wherein the first software package includes declarations of one or more unit types, wherein each software package from the plurality of software packages defines one or more service units, and wherein one or more of the one or more service units implements one of the one or more unit types; while executing the first software package, fetch, from a centralized registry, a first set of implementations of the one or more unit types by the one or more service units; and while executing the first software package: load one or more service units defined by the first software package with the first set of implementations; and execute the one or more service units based on the first set of implementations.

Example 18. The computer-readable storage medium of example 17, wherein the one or more processors are further configured to: execute, at a second time, the first software package; while executing the first software package, fetch, from the centralized registry, a second set of implementations of the one or more unit types by the one or more service units; while executing the first software package, update the one or more service units defined by the first software package with the second set of implementations; and execute the one or more service units based on the second set of implementations.

Example 19. The computer-readable storage medium of any of examples 17 and 18, wherein different service units defined by different software packages are configured to simultaneously implement one of the one or more unit types.

Example 20. The computer-readable storage medium of any of examples 17-19, wherein the centralized registry includes a list of registered service units for each of the one or more unit types, and wherein each registered service unit implements one of the one or more unit types.

Example 21. The computer-readable storage medium of any of examples 17-20, wherein the one or more unit types include one or more of a public type, a protected type, and a local type, and wherein the one or more unit types are declared in accordance with an inter-process communication policy including information indicative of one or more software packages authorized to implement the one or more unit types.

Example 22. The computer-readable storage medium of example 21, wherein the one or more unit types include the protected type, wherein the one or more processors are further configured to: determine whether each of the one or more software packages is authorized to implement the protected type.

Example 23. The computer-readable storage medium of any of examples 17-22, wherein the one or more unit types include one or more interface types, and wherein the one or more service units include one or more Remote Procedure Call servers and one or more Remote Procedure Call clients.

Example 24. The computer-readable storage medium of any of examples 17-23, wherein the one or more unit types include one or more message types, and wherein the one or more service units include one or more publisher units and one or more subscriber units.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structures or any other structure suitable for implementation of the techniques described. In addition, in some examples, the functionality described may be provided within dedicated hardware and/or software modules. Also, the techniques could be fully implemented in one or more circuits or logic elements.

What is claimed is:

1. A method comprising:

executing, at a first time, and by an operating system of a software-defined vehicle, a first software package from a plurality of software packages, wherein each software package from the plurality of software packages defines one or more service units that each implement a respective unit type from a plurality of unit types, and wherein the first software package declares at least one unit type from the plurality of unit types in accordance with an inter-process communication policy including information indicative of one or more software packages from the plurality of software packages that are authorized to implement the at least one unit type; and while executing the first software package:

fetching, by the operating system and from a centralized registry, a first set of implementations of the at least one unit type by the one or more software packages that are authorized to implement the at least one unit type;

dynamically loading, by the operating system, one or more service units defined by the first software package with the first set of implementations; and executing, by the operating system, the one or more service units defined by the first software package based on the first set of implementations.

2. The method of claim 1, further comprising:

executing, at a second time, and by the operating system, the first software package;

while executing the first software package, fetching, by the operating system and from the centralized registry, a second set of implementations of the at least one unit type by the one or more software packages that are authorized to implement the at least one unit type;

while executing the first software package, updating, by the operating system, the one or more service units defined by the first software package with the second set of implementations; and executing, by the operating system, the one or more service units defined by the first software package based on the second set of implementations.

3. The method of claim 1, wherein a subset of service units defined by different software packages are configured to simultaneously implement a same unit type of the plurality of unit types.

4. The method of claim 1, wherein the centralized registry includes a list of registered service units for each of the plurality of unit types, and wherein each registered service unit implements one unit type of the plurality of unit types.

5. The method of claim 1, wherein the plurality of unit types include one or more of a public type, a protected type, and a local type.

6. The method of claim 5, wherein the plurality of unit types include the protected type, the method further comprising:

determining, by the operating system, whether a respective software package of the plurality of software packages is authorized to implement the protected type.

7. The method of claim 1, wherein the plurality of unit types include one or more interface types, and wherein the one or more service units include one or more Remote Procedure Call servers and one or more Remote Procedure Call clients.

8. The method of claim 1, wherein the plurality of unit types include one or more message types, and wherein the one or more service units include one or more publisher units and one or more subscriber units.

9. A computing system for a software-defined vehicle, the computing system comprising:

one or more processors; and one or more storage devices that store instructions, wherein the instructions, when executed by the one or more processors, cause the one or more processors to:

execute, at a first time, a first software package from a plurality of software packages, wherein each software package from the plurality of software packages defines one or more service units that each implement a respective unit type from a plurality of unit types, and wherein the first software package declares at least one unit type from the plurality of unit types in accordance with an inter-process communication policy including information indicative of one or more software packages from the plurality of software packages that are authorized to implement the at least one unit type; and while executing the first software package:

fetch, from a centralized registry, a first set of implementations of the at least one unit type by the one or more software packages that are authorized to implement the at least one unit type;

dynamically load one or more service units defined by the first software package with the first set of implementations; and execute the one or more service units defined by the first software package based on the first set of implementations.

10. The computing system of claim 9, wherein the instructions further cause the one or more processors to:

execute, at a second time, the first software package;

while executing the first software package, fetch, from the centralized registry, a second set of implementations of the at least one unit type by the one or more software packages that are authorized to implement the at least one unit type;

while executing the first software package, update the one or more service units defined by the first software package with the second set of implementations; and execute the one or more service units defined by the first software package based on the second set of implementations.

11. The computing system of claim 9, wherein a subset of service units defined by different software packages are configured to simultaneously implement a same unit type of the plurality of unit types.

12. The computing system of claim 9, wherein the centralized registry includes a list of registered service units for each unit type of the plurality of unit types, and wherein each registered service unit implements one unit type of the plurality of unit types.

13. The computing system of claim 9, wherein the plurality of unit types include one or more of a public type, a protected type, and a local type.

14. The computing system of claim 13, wherein the plurality of unit types include the protected type, and wherein the instructions further cause the one or more processors to:

determine whether a respective software package of the plurality of software packages is authorized to implement the protected type.

15. The computing system of claim 9, wherein the plurality of unit types include one or more interface types, and wherein the one or more service units include one or more Remote Procedure Call servers and one or more Remote Procedure Call clients.

16. The computing system of claim 9, wherein the plurality of unit types include one or more message types, and wherein the one or more service units include one or more publisher units and one or more subscriber units.

17. A non-transitory computer-readable storage medium storing instructions that, when executed, cause one or more processors of a computing system for a software-defined vehicle to:

execute, at a first time, a first software package from a plurality of software packages, wherein each software package from the plurality of software packages defines one or more service units that each implement a respective unit type from a plurality of unit types, and wherein the first software package declares at least one unit type from the plurality of unit types in accordance with an inter-process communication policy including information indicative of one or more software packages from the plurality of software packages that are authorized to implement the at least one unit type; and while executing the first software package:

fetch, from a centralized registry, a first set of implementations of the at least one unit type by the one or more software packages that are authorized to implement the at least one unit type;

dynamically load one or more service units defined by the first software package with the first set of implementations; and execute the one or more service units defined by the first software package based on the first set of implementations.

18. The non-transitory computer-readable storage medium of claim 17, wherein the instructions further cause the one or more processors to:

execute, at a second time, the first software package;

while executing the first software package, fetch, from the centralized registry, a second set of implementations of the at least one unit type by the one or more software packages that are authorized to implement the at least one unit type;

while executing the first software package, update the one or more service units defined by the first software package with the second set of implementations; and execute the one or more service units defined by the first software package based on the second set of implementations.

19. The non-transitory computer-readable storage medium of claim 17, wherein a subset of service units defined by different software packages are configured to simultaneously implement a same unit type of the plurality of unit types.

20. The non-transitory computer-readable storage medium of claim 17, wherein the centralized registry includes a list of registered service units for each of the plurality of unit types, and wherein each registered service unit implements one unit type of the plurality of unit types.

* * * * *